No. 768,246. PATENTED AUG. 23, 1904.
J. E. TAYLOR.
PRESSURE REDUCING VALVE.
APPLICATION FILED DEC. 29, 1903.
NO MODEL.

Witnesses
Joseph Kinvin
William J. Clark

Inventor
John E. Taylor
By Luther V. Moulton
Attorney

No. 768,246. Patented August 23, 1904.

UNITED STATES PATENT OFFICE.

JOHN E. TAYLOR, OF NASHVILLE, MICHIGAN.

PRESSURE-REDUCING VALVE.

SPECIFICATION forming part of Letters Patent No. 768,246, dated August 23, 1904.

Application filed December 29, 1903. Serial No. 186,934. (No model.)

*To all whom it may concern:*

Be it known that I, JOHN E. TAYLOR, a citizen of the United States, residing at Nashville, in the county of Barry and State of Michigan, have invented certain new and useful Improvements in Pressure - Reducing Valves; and I do hereby declare the following to be a full, clear, and exact description of the invention, such as will enable others skilled in the art to which it appertains to make and use the same.

My invention relates to pressure-reducing valves; and its object is to provide the same with certain new and useful features hereinafter more fully described, and particularly pointed out in the claims.

My device consists, essentially, of a suitable valve interposed in the circuit of the fluid, a spring to open the valve, means for adjusting the tension of the spring, a piston to close the valve, a cylinder inclosing the piston, and a branch pipe to convey the fluid of reduced pressure to the cylinder to operate the piston and close the valve, as will more fully appear by reference to the accompanying drawings, in which—

Figure 1:
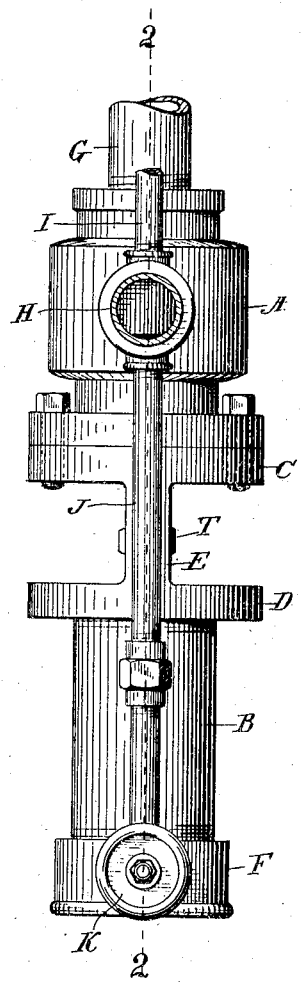
Figure 2:
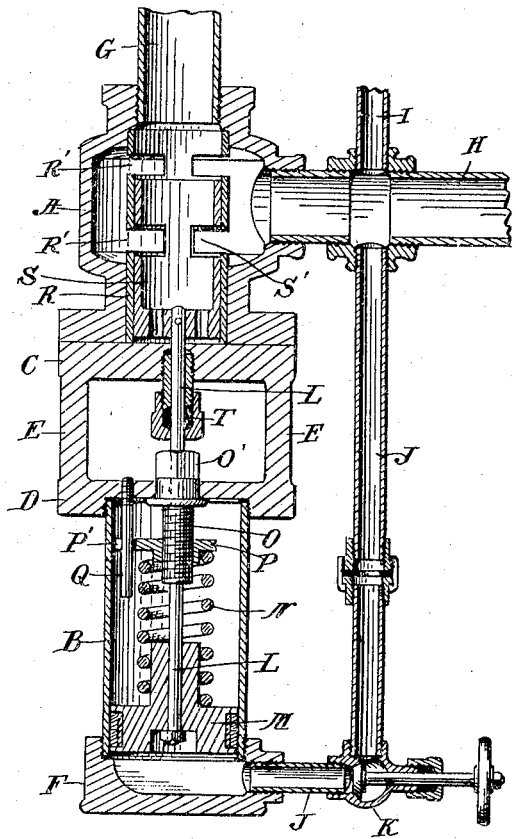

Figure 1 is an elevation of a device embodying my invention, and Fig. 2 a vertical section of the same on the line 2 2 of Fig. 1.

Like letters refer to like parts in both of the figures.

A represents the casing of the valve.

R is the outer fixed tube of the valve arranged in the axis of the casing A' and having lateral ports R' opening into the interior of the casing.

S is the inner and movable tube of the valve, which tube is provided with lateral ports S', which when the valve is open are opposite the lower ports R'. When the inner tube is moved upward, it will cover the ports R' and partially or wholly close the same.

G is a pipe to admit the high-pressure fluid to the interior of the tubes R and S, and H a pipe to convey away the fluid after the pressure of the same has been reduced by the valve, as hereinafter described.

L is a rod to operate the valve. Said rod is attached to the inner tube S at one end by means of a suitable head having openings therethrough and extending downward therefrom is attached at the other end to a piston M, inclosed in a cylinder B, the lower end F of which cylinder is connected to the pipe H by means of a branch pipe J, provided with a valve K to cut off the flow of fluid therethrough. The fluid after passing through the valve and being reduced in pressure thereby flows through this pipe J and entering beneath the piston forces the same upward and closes the valve more or less, and thus determines the reduction of pressure of the fluid flowing therethrough. To adjust the pressure on the reduced side, a spring N is provided, having one end engaging the piston M and the other end engaging an adjustable nut P, mounted on a screw-threaded sleeve O, having an axial opening through which the rod L extends. Said sleeve extends through an opening in the upper head D of the cylinder and is rotative therein and also provided with a suitable square end O', to which a wrench may be applied to rotate the screw. To prevent the nut from rotating with the screw and permit it to move vertically, it is extended, as at P', and said extension is provided with an opening in which is a pin Q, extending downward from the head D. The nut P can thus be vertically adjusted to adjust the tension of the spring N as occasion may require.

T is a suitable gland surrounding the rod L and inserted in a head C, attached to the end of the valve-case A and closing the same. The heads C and D are spaced apart by connecting-bars E a sufficient distance to afford room for the gland T and end O' of the screw and to permit of access thereto for adjusting the same.

I represents a branch pipe from the pipe H, to which any convenient gage may be attached to show reduced pressure on the fluid after passing through the valve.

In operation the spring N tends to hold the valve open and permit the full pressure of the fluid to pass therethrough. The fluid flowing through the pipe J passes under the piston and tends to raise the same, and thus to compress the spring and close the valve, the result being that the fluid-pressure can be determined by the tension of the spring. The lighter the tension of the spring the more readily the valve will be closed, and thus the pressure will be less on the reduced side, and by increasing the tension of the spring it will require more pressure to close the valve, and thus the reduced pressure will be higher in accordance with the adjustment of the spring.

In the event that the device is to be put out of action for any reason and the full pressure permitted to flow therethrough it is only necessary to close the valve K, and thus prevent any pressure of fluid under the piston M. The valve then remains wide open and allows the full pressure to flow therethrough.

Having thus fully described my invention, what I claim, and desire to secure by Letters Patent, is—

1. In combination with a piston and rod to operate a pressure-regulating valve; means for admitting fluid from the low-pressure side of the valve to one side of the piston to move the same in one direction, a spring at the other side of the piston to move the same in the other direction, a sleeve rotative and slidable on the rod, said sleeve also having an external screw-thread, a nut on the sleeve, said nut having a lateral extension, and a pin slidably engaging said extension.

2. In combination with a pressure-reducing valve, a rod attached to the valve at one end, a cylinder inclosing the other end of the rod, said cylinder having a head at each end, a pipe connecting the cylinder with the low-pressure side of the valve, a screw-threaded sleeve rotative in one cylinder-head and surrounding the rod, a nut on the sleeve, and located within the cylinder, and means for holding the nut from rotating with the sleeve.

3. The combination of a valve-case, a tube in the axis of the valve-case and having lateral ports, a tube movable within the first-named tube to close the said ports, a pipe to admit fluid to the interior of the tubes, a pipe connected to the case, a cylinder attached to the case, a piston in the cylinder, a rod connecting the piston and the inner tube, heads on the cylinder, one of said heads being attached to the case, a screw-threaded sleeve rotative in said head and surrounding the rod, a nut on the sleeve, a spring between the nut and the piston, and a branch pipe connecting the valve-case and one end of the cylinder.

4. The combination of a valve-case, a fixed tube in the axis of the case and having lateral ports, a movable tube within the fixed tube to close said ports, a rod attached to the inner tube and extending downward therefrom, a piston attached to the lower end of the rod, two heads spaced apart and connected by bars, one of said heads being attached to the valve-case, a cylinder attached to the other head and surrounding the piston, a tubular screw projecting through the cylinder-head and rotative therein, and also surrounding the rod, a nut on the screw said nut having a lateral projection, a pin in the cylinder-head and engaging said projection, a spring between the nut and piston, a branch pipe connecting the valve and lower end of the cylinder, and a valve in the branch pipe.

In testimony whereof I affix my signature in presence of two witnesses.

JOHN E. TAYLOR.

Witnesses:
C. A. HOUGH,
C. H. TUTTLE.